United States Patent
Matzenmuller et al.

(10) Patent No.: US 7,584,687 B2
(45) Date of Patent: Sep. 8, 2009

(54) TOOL AND HOLDER FOR THERMOFORMING MACHINE

(75) Inventors: Jurgen Matzenmuller, Bellamont (DE); Jorg Knuppel, Schwendi (DE); Detlev Gertitschke, Laupheim (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 413 days.

(21) Appl. No.: 11/654,451

(22) Filed: Jan. 17, 2007

(65) Prior Publication Data

US 2007/0189866 A1    Aug. 16, 2007

(30) Foreign Application Priority Data

Jan. 28, 2006    (DE)    ......... 10 2006 004 093

(51) Int. Cl.
  *B23Q 3/155*    (2006.01)
  *B23B 29/00*    (2006.01)
(52) U.S. Cl. ............ 82/160; 29/48.5 A; 82/170
(58) Field of Classification Search ........ 407/48, 407/40, 53, 103, 33, 34, 64; 82/160, 161, 82/170; 29/48.5 A, 57, 33 K; 409/287
See application file for complete search history.

(56) References Cited

U.S. PATENT DOCUMENTS

| | | | |
|---|---|---|---|
| 3,499,068 A * | 3/1970 | Brown | 264/68 |
| 4,335,499 A * | 6/1982 | Prat | 483/59 |
| 4,468,019 A * | 8/1984 | Staudenmaier | 269/56 |
| 4,773,839 A * | 9/1988 | Case et al. | 425/186 |
| 6,475,423 B1 | 11/2002 | Masterson | 264/511 |
| 2006/0099292 A1 | 5/2006 | Matzenmuller | 425/387.1 |

FOREIGN PATENT DOCUMENTS

| | | |
|---|---|---|
| DE | 27 18 126 | 11/1978 |
| DE | 195 04 513 | 1/1999 |
| GB | 2252746 | 8/1992 |
| GB | 2347171 | 11/1999 |

* cited by examiner

Primary Examiner—Willmon Fridie
(74) Attorney, Agent, or Firm—Andrew Wilford

(57) ABSTRACT

A tool assembly for a thermoforming machine has a tool holder having an abutment face and a tool having an abutment part. The tool and holder have a groove and a rail fittable in the groove for fitting the tool to the holder into a working position with the abutment part abutting the abutment face. A part-conical seat centered on a tool axis is formed on the tool. A pin formed with a part-conical head face complementary to the seat and centered on a pin axis is carried on the holder. The seat and head are positioned on the tool and holder such that in the working position the axes are generally parallel but slightly offset from each other and the part-conical head face is axially engageable with the seat.

10 Claims, 4 Drawing Sheets

TOOL AND HOLDER FOR THERMOFORMING MACHINE

FIELD OF THE INVENTION

The present invention relates to thermoforming machine. More particularly this invention concerns a thermoforming station having a tool holder and an exchangeable tool, e.g. a die, fittable therewith.

BACKGROUND OF THE INVENTION

Thermoforming machines for processing thermoplastic films comprise a plurality of work stations through which the thermoplastic film is passed for processing in such a way that blister packages filled with product are produced at the downstream end of the work process. To this end, the thermoplastic film is heated to the deformation temperature in a heating station, for example, to enable the thermoplastic film to be subsequently shaped in a forming station, typically by forming in the film or foil an array of pockets. This forming station is generally followed by a filling station, in which the products are filled into the pockets in the thermoplastic film. It is also necessary to permanently and tightly seal cups filled in this manner in a sealing station, by laminating an upper cover film to the lower film over its pockets. A downstream punching station cuts individual blister packages out of laminated and filled films.

As described in German patent documents 2,718,126 of Landsteiner and 195 04 513 of Emmert, it is important that in most of the work stations tools are used which as formatting parts must be adapted to the format of the particular blister packages to be produced. In particular in a forming station, the quality of the forming process greatly depends on the correct positioning of the forming tools in order to subsequently centrally place the products in the cups and then seal these cups in the sealing station.

OBJECTS OF THE INVENTION

It is therefore an object of the present invention to provide an improved tool assembly for a work station of a thermoforming machine.

Another object is the provision of such an improved tool assembly for a work station of a thermoforming machine that overcomes the above-given disadvantages, in particular that makes changing of the tools fairly simple while at the same time ensuring achieving high precise tool positioning.

SUMMARY OF THE INVENTION

A tool assembly for a thermoforming machine has according to the invention a tool holder having an abutment face and a tool having an abutment part. The tool and holder have a groove and a rail fittable in the groove for fitting the tool to the holder into a working position with the abutment part abutting the abutment face. A part-conical seat centered on a tool axis is formed on the tool. A pin formed with a part-conical head face complementary to the seat and centered on a pin axis is carried on the holder. The seat and head are positioned on the tool and holder such that in the working position the axes are generally parallel but slightly offset from each other and the part-conical head face is axially engageable with the seat. A fluid cylinder connected to the pin and pressurizable in the working position pushes the part-conical head face off the seat. A spring connected to the pin urges the part-conical head face against the seat and thereby pushes the holder and seat apart perpendicular to the axes, thereby clamping the rail and groove and/or the abutment part and abutment face together.

This work station or tool assembly therefore has, as a result of the combination of a motion in a longitudinal and in a transverse direction, a reproducible positioning of the tool that ensures that the tool is securely held during horizontal and vertical movement of the station or tool assembly. This is done by making use of the cooperation of the part-conical pin face and the part-conical seat face, which further results in reduction of possible play caused by the offset of the center axes because the offset provided according to the invention results in secure engagement of the part-conical seat face with the part-conical pin face, and a smaller adjustment range for the tool is necessitated for compensating for the original offset during the clamping process.

It is also important to note that the thermoforming machines that have the work station according to the invention are frequently used in the pharmaceutical industry, in which very stringent requirements are imposed on product security so that the pharmaceutical products do not prematurely age, and that the active ingredients contained in the products do not prematurely decompose due to inadequate air-tightness of the packaging. Since the tools are exchangeable and are also subject to a certain amount of wear, it is important that only tools are used that meet the required specifications in order to exclude substitute tools having impermissible tolerances. For this reason it is further provided that a tool identifier is associated with the tool, and a tool identification system for monitoring the tool identifier is associated with the tool holder, so that corresponding control may be achieved when the tool is pushed onto the tool holder and the desired working position is attained. In the simplest procedure this is accomplished by the fact that the tool identifier and the tool identification system have complementary structures according to the lock-key principle, so that the positionable correct agreement of the structures allows the tool to assume the proper working position on the tool holder. Thus, it is also literally possible to provide a key which principally authorizes the use of a tool.

Alternatively, the tool identifier may also have a writable data carrier for reading by use of a unit, associated with the tool identification system, for reading and/or writing, the read-write unit in particular allowing additional utilization, since the maintenance interval for use of the tool may be monitored so as to permit an integrated elapsed time meter to be implemented.

The security may be further increased by associating the tool holder with an inductive sensor for detecting the position of the tool. Tool replacement is further simplified when the groove is an undercut or T-section groove, since in particular for tools which are used when suspended the undercut groove, which is can be a dovetail for example, is able to carry the weight of the tool, thereby relieving the user, who need only perform the radial insertion motion, after which the tool is forcefully positioned as a result of the axial adjustment of the clamping cylinder brought about by the clamping spring.

It is also possible to provide in the tool a cooling system, supplied through the tool holder, which may be flange-mounted by pushing on plug-in connectors which are associated with compensation elements. In this regard it is important for the plug-in connectors to also have complementary structures, which may thus be used for implementing the lock-key principle.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
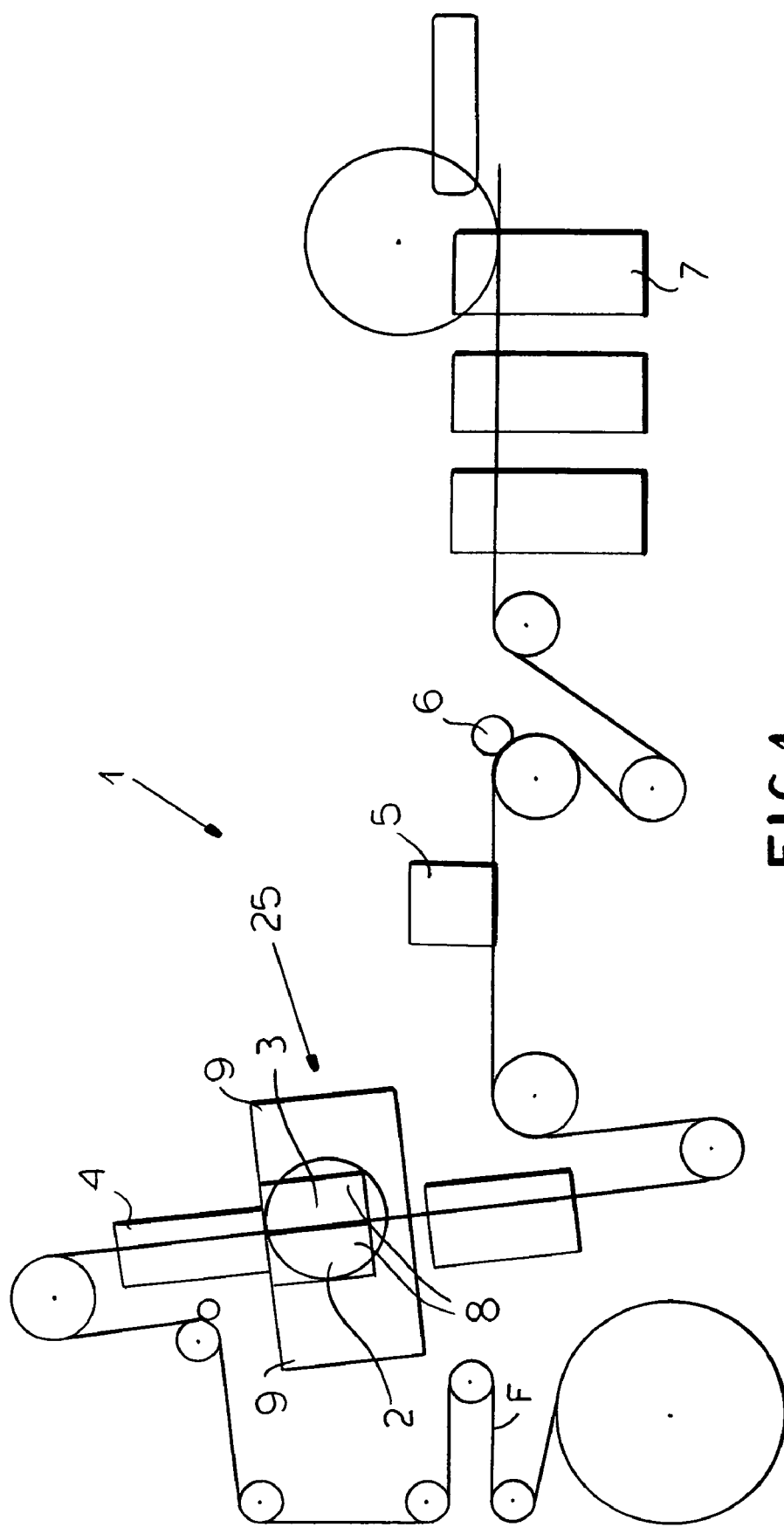
FIG. 1 is a largely schematic view of a packaging machine incorporating a thermoforming station according to the invention.

As seen in FIG. 1 a thermoforming machine 1 in which has a forming station 25 with a lower forming tool assembly 2 and an upper forming tool assembly 3. The thermoforming machine 1 further comprises work stations represented only schematically by rectangles, namely, a heating station 4, a filling station 5, a sealing station 6, and a punching station 7. The machine 1 serves to form a film F pulled off a supply with pockets, then fill the pockets at 5, laminate a top foil to the pocketed filled film F at 6, then cut it into individual packages at 7.

Each of the tool assemblies 2 and 3 is comprised of a tool 8 (FIGS. 3 and 4) releasably mounted in a tool holder 9 (FIG. 2). which provides a stop surface for the tool 8. The holder 9 is provided on a planar face 31 with a T-section rail formation 16a and the tool 8 is formed on a planar face 32 with a complementary T-section groove formation 16b. Thus the tool rail 16a of the holder 9 can be fitted to the groove 16b of the tool and the two slid together until an end abutment bar 29 on the tool 8 abuts an end face 30 of the holder 9. Normally the formations 16a and 16b extend transversely of a transport direction of the film F.

Figure 4:
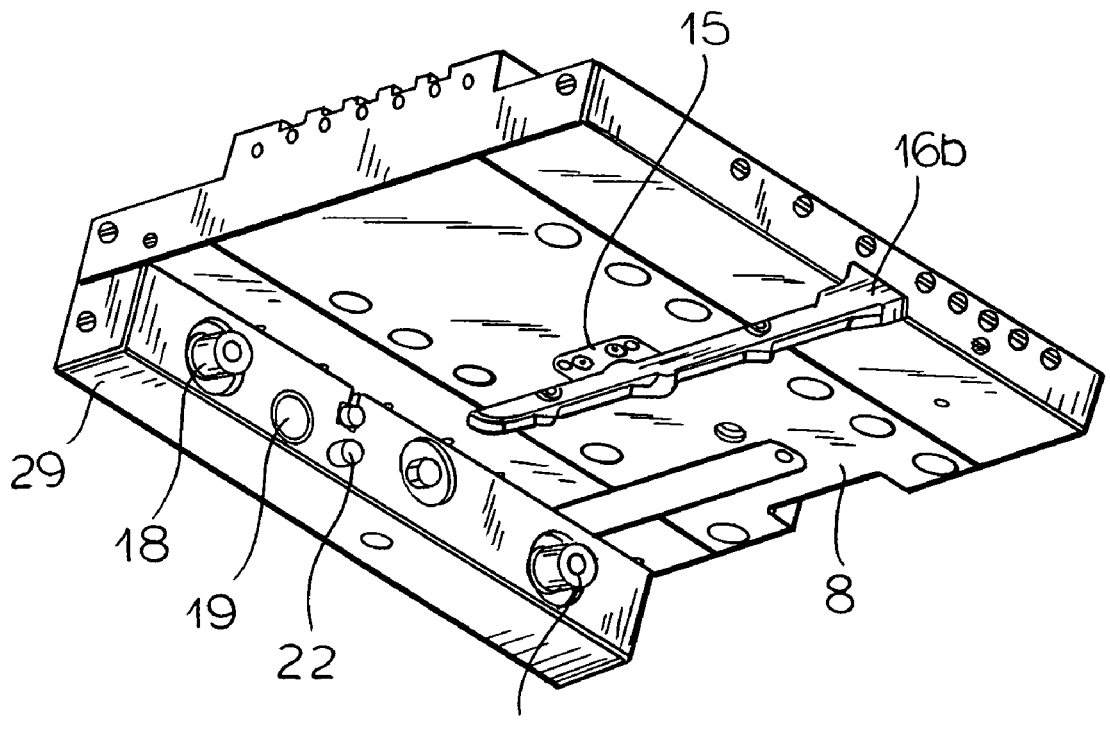
FIG. 4 is a perspective view from below of the tool of FIG. 3.
Figure 5:
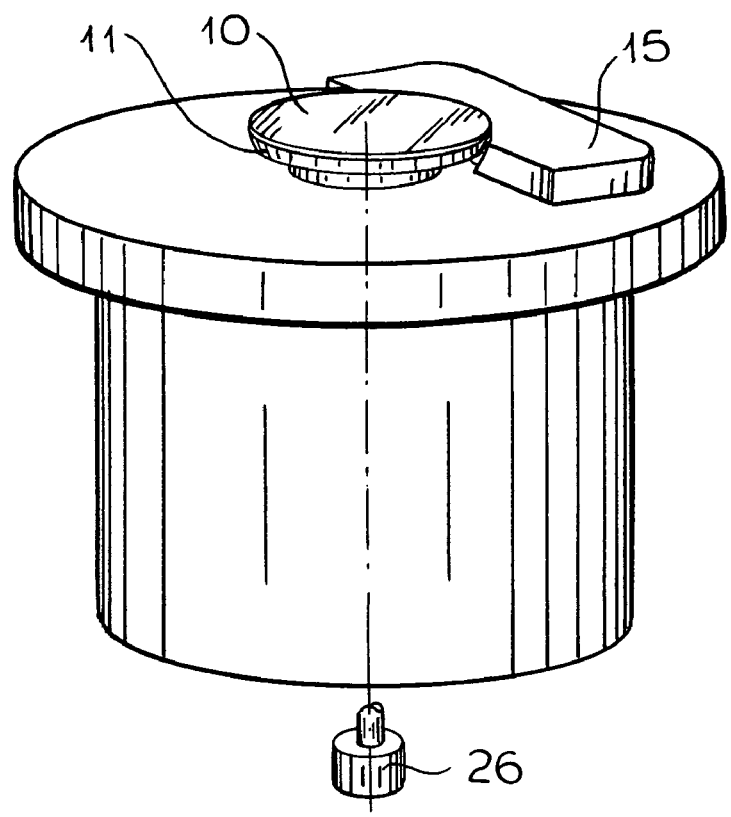
FIG. 5 is a large-scale view of the holding unit of the tool holder and part of the tool.
Figure 7:
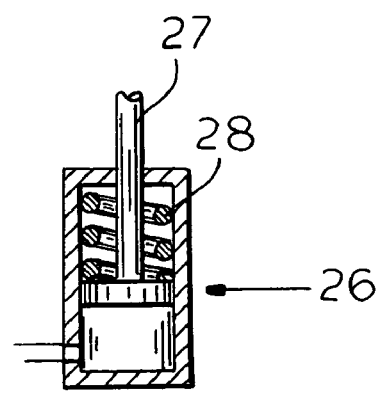
FIG. 7 is a section through an actuator for the holding unit of FIG. 5.

In order to ensure perfect positioning of pocket-forming recesses 33 on the exposed side of the tool 8, this tool 8 is provided as shown in FIG. 4 at one edge of the groove 16b with a part-conical seat 15. The holder 9 is provided in a central gap of the rail 16a with a locking pin 10 having a complementary frustoconical or part-conical face 11. This pin 9 is operated as shown in FIG. 7 by a piston rod 27 of a cylinder 26 that is spring loaded so as normally to retract the pin 10 inward in the same direction as the taper of its surface 11.

Figure 6:
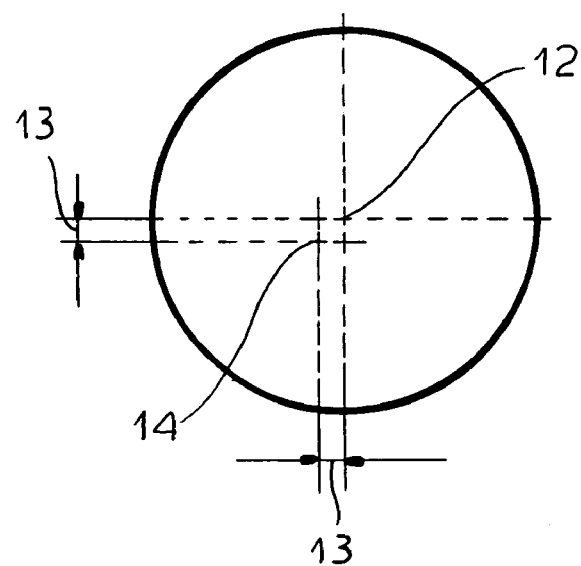
FIG. 6 is a diagram illustrating functioning of the holding unit of FIG. 5.

As shown in FIG. 6 when the rail 16a is centered in the groove 16b, in which it fits with a small amount of play, and when the bar 29 of the tool 8 is bearing on the face 30 of the holder 9, a center 12 of the frustoconical face 11 of the bolt 10 is offset parallel to and perpendicular to the rail 16a by a small distance 13 from a center of curvature of the complementary surface of the seat 15. Thus when the cylinder 26 is not pressurized the spring 28 pulls the bolt 10 down and causes the surface 11 to engage the seat 15 and press the tool 8 both toward the face 30 and transversely away from the seat 15 so as to lock it solidly in the holder 9. In this manner even though there might be some transverse play between the rail 16a and groove 16b, the tool 8 is held solidly in an exact position in the holder 9.

Figure 2:
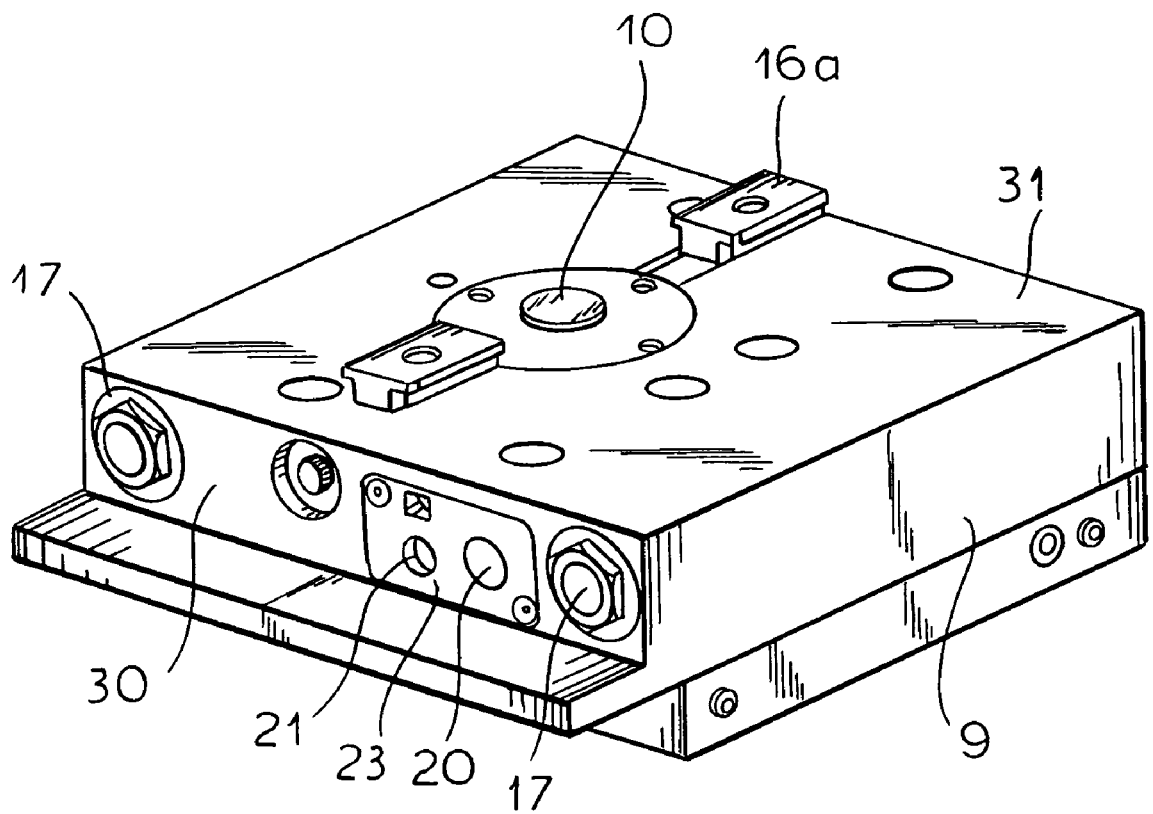
FIG. 2 is a perspective view from above of a tool holder according to the invention.
Figure 3:
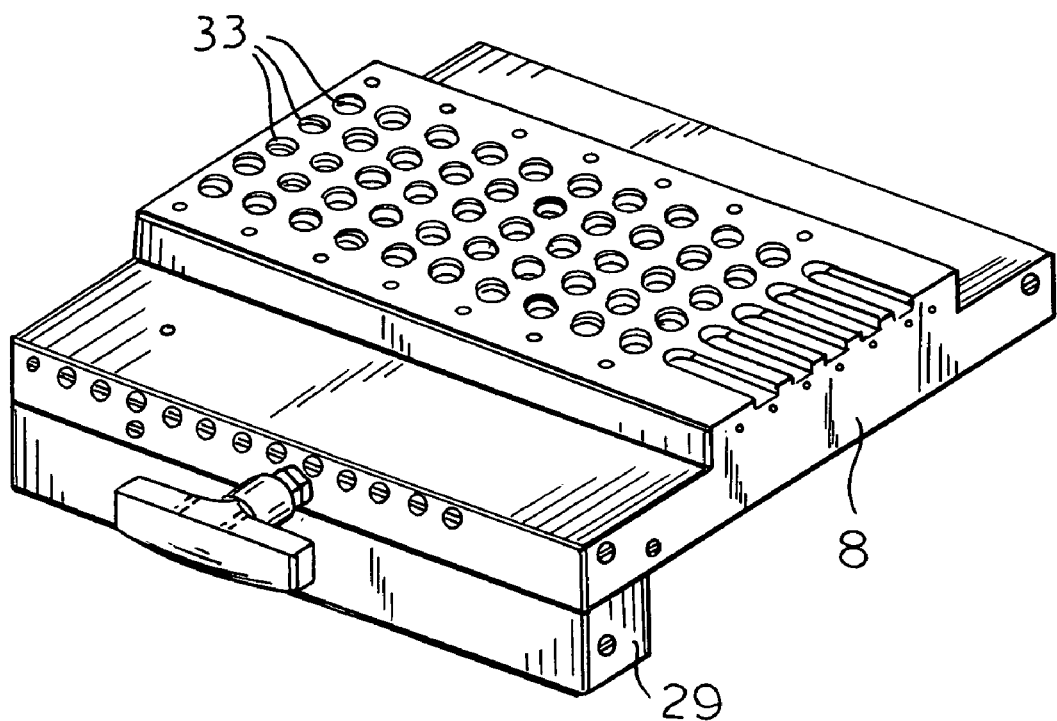
FIG. 3 is a perspective view from above of a tool fittable with the FIG. 2 holder.

FIGS. 2 and 4 show connections 17 of a cooling system on the holder 9 and complementary connection nipples 18 that can fit into them on the bar 29 when the tool 8 is fitted to the holder 9. The locking system according to this invention with the bold 10 ensures that these connections 17 and 18 fit tightly together.

A tool identifier or data carrier 19 is provided on the tool 8. An identification system has a reader or sensor 20 on the holder 9 that is juxtaposed with the identifier 19 when the tool is in position so that the system can electronically identify what tool is fitted to the holder 9. FIG. 2 also shows an inductive sensor 21 on the tool holder 9 which is used for position scanning. To this end, as seen in FIG. 4 the tool 8 has a pin 22 which engages in a seat 23 in the tool holder 9, the pin and pin receptacle being complementary and also having a more complex design to make use of the lock-key principle for the tool identification.

We claim:

1. A tool assembly for a thermoforming machine, the assembly comprising:
   a tool holder having an abutment face;
   a tool having an abutment part;
   means on the tool and holder including a groove and a rail fittable in the groove for fitting the tool to the holder into a working position with the abutment part abutting the abutment face;
   a part-conical seat centered on a tool axis and formed on the tool;
   a pin formed with a part-conical head face complementary to the seat, centered on a pin axis, and carried on the holder, the seat and head being positioned on the tool and holder such that in the working position the axes are generally parallel but slightly offset from each other and the part-conical head face is axially engageable with the seat;
   a fluid cylinder connected to the pin and pressurizable in the working position to push the part-conical head face off the seat; and
   spring means connected to the pin for urging the part-conical head face against the seat and thereby pushing the holder and seat apart perpendicular to the axes.

2. The tool assembly defined in claim 1 wherein the ridge and groove extend perpendicular to the abutment face and abutment part in the working position.

3. The tool assembly defined in claim 2 wherein the axes are offset relative to each other parallel to the ridge and groove in the working position.

4. The tool assembly defined in claim 2 wherein the axes are offset relative to each other perpendicular to the ridge and groove in the working position.

5. The tool assembly defined in claim 2 wherein the axes are offset relative to each other both parallel and perpendicular to the ridge and groove in the working position.

6. The tool assembly defined in claim 2 wherein the rail and groove are of T-section.

7. The tool assembly defined in claim 6 wherein the rail is formed on the holder and has a central gap provided with the seat.

8. The tool assembly defined in claim 1 further comprising
   a data carrier on the tool and
   a data reader on the holder closely juxtaposed with the carrier in the working position.

9. The tool assembly defined in claim 1 wherein the holder is provided with means including an inductive sensor for determining a position of the tool in the holder.

10. The tool assembly defined in claim 1 further comprising means including connections on the holder and on the tool fitting together in the working position for passing a coolant from the holder through the tool.

* * * * *